Patented May 14, 1940

2,201,108

UNITED STATES PATENT OFFICE 2,201,108

DENATURED ALCOHOL COMPOSITION

Paul Mahler, New York, N. Y., and Carl Haner, Moylan, Pa., assignors to Publicker Inc., Philadelphia, Pa., a corporation of Delaware No Drawing. Application October 15, 1937, Serial No. 169,253

2 Claims. (Cl. 202—77)

The present invention relates to certain new and useful denatured alcohol compositions which will more effectively resist the usual commercial feasible "clean-up" steps, both chemical as well as physical, and which will impart both to the initially denatured alcohol composition, as well as to the recovered alcohol resulting from any such "clean-up" steps, an "off" taste and/or odor, without however detracting from the appearance of the initially denatured alcohol composition or without detracting from its normal commercial usage.

We have found that certain organic nitriles of the aliphatic series will form with ethyl alcohol (of the usual commercial concentration) highly desirable and effective denatured alcohol compositions. The organic nitriles to which we particularly refer possess the following characteristics:

(1) Contain from 3 to about 6 carbon atoms.
(2) Contain a carbon atom triple bonded to a nitrogen atom.
(3) Have boiling points between the range of about 98° C. to about 165° C.
(4) Form with ethyl alcohol and water an azeotrope of a boiling point sufficiently close to that of ethyl alcohol to prevent separation thereof by fractional distillation.

An organic nitrile of the foregoing definition is exemplified for instance by allyl cyanide, ethyl cyanide, iso and normal butyl cyanide, and iso and normal amyl cyanide.

Ethyl cyanide or propionitrile_____ $C_2H_5CN$

Allyl cyanide or vinyl aceto nitrile
$$CH_2=CH \cdot CH_2CN$$

Valeronitrile or butyl cyanide_____ {normal: $CH_3CH_2CH_2CH_2CN$
iso: $(CH_3)_2CH \cdot CH_2CN$ Normal and iso capronitrile or amyl cyanides_____ {normal: $CH_3(CH_2)_4CN$
iso: $(CH_3)_2CH \cdot CH_2CH_2CN$ We have found that an organic nitrile of the aliphatic series and having the identifying characteristics above set forth will combine with ethyl alcohol of the usual commercial concentration to form a denatured alcohol composition which will effectively resist both chemical as well as physical "clean-up" steps, so that the recovered alcohol will in any event possess an "off" taste and/or odor.

This taste or odor may be accentuated and in some cases entirely altered by the chemical step or steps in the "clean-up" treatment; causing either partial or complete decomposition of the nitrile.

Thus, it is believed that the nitriles of the kind hereinabove defined may, under certain conditions in the "clean-up" operations undergo changes in taste and/or odor, but the changed or new taste and/or odor is as identifying to the recovered alcohol as that imparted by the original material.

About one to two parts, by volume, to one hundred parts of ethyl alcohol of the usual commercial concentration is found to be adequate.

It is to be understood that homologues and derivatives possessing the characteristics hereinabove referred to may be used as equivalents.

Likewise, saturated aliphatic nitriles and their derivatives having the characteristics hereinabove referred to may be used as equivalents.

The efficacy of a denaturant depends primarily on the difficulty with which it can be removed from the alcohol, and the degree of obnoxiousness imparted by the taste and/or odor of the recovered spirit.

To evaluate denaturants it is therefore essential to apply a "clean-up" testing technique sufficiently vigorous so that logical comparisons can be made.

Compared to the efficacy of many denaturants heretofore proposed, the denatured alcohol compositions according to our present invention possess highly improved characteristics especially from the standpoint of the difficulty of denaturant removal. For example, after subjection to a test for denaturant removal corresponding to the most drastic treatment commercially feasible, the denatured alcohol of the present invention is still unpotable. This drastic test comprises the dilution of the denatured alcohol with salt solution; treatment with a solvent (as for instance toluene, $CCl_4$, etc.), followed by decantation; activated charcoal treatment; and then an oxidizing agent and finally distillation through a highly efficient fractionating column.

A far less drastic clean-up treatment will effectively remove, for instance, the type of denaturant substances which may properly be called higher aliphatic alcohols, such as:

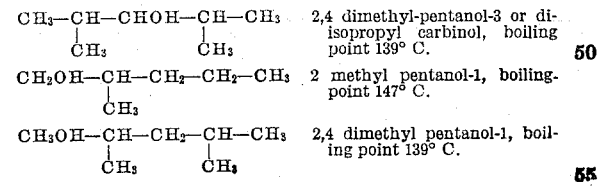

This indicates that these alcohols do not form an azeotrope with 95% alcohol, whereas the materials remaining after the several "cleaning-up" steps do distil sufficiently with the alcohol from a 33% to 25% saline alcohol-water solution to impart some degree of protection to the recovered alcohol.

Denaturants of this type are disadvantageous, not only because they fail to form azeotropes with 95% alcohol, but also because they possess a lasting power of odor and have a lasting color which is imparted by them to the alcohol denatured thereby.

Adequate protection against "cleaning-up" is demanded by the governing authorities, but detrimental properties, such as distasteful odors (initial or residual) or discoloration, will produce unfavorable reactions from the consumer.

A good denaturant should leave the denatured alcohol spirit composition as nearly alike to pure neutral spirits, as possible. It should only affect its taste both before and after attempting any commercially feasible "cleaning-up" technique. This means that a colorless material is more useful than one that is colored. Similarly, the less pronounced the odor the better will be the resultant denatured alcohol compositions for most commercial uses or purposes. If it is odorous, then the more agreeable it is in character the greater the advantage. If on evaporation there remains no residual odor, or only a slight one, it will be more desirable. In other words, a good denaturant should leave the character of the original spirit (when used as such or in combination with other materials) as unaffected as possible, but protect the alcohol against any commercially feasible "cleaning-up" procedure. The lower the concentration of denaturant used, the greater advantage to the alcohol manufacturer, since he sells more of the material he produces, and less of the material which he must generally purchase.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed as new and desired to be secured by Letters Patent is:

1. A denatured ethyl alcohol composition, for use as alcohol, including at least 90% of ethyl alcohol of commercial concentration and a small proportion of generally pure allyl cyanide.

2. A denatured ethyl alcohol composition, for use as alcohol, including at least 90% of ethyl alcohol of commercial concentration and approximately one to two parts of generally pure allyl cyanide, by volume, to one hundred parts of ethyl alcohol of commercial concentration.

PAUL MAHLER.
CARL HANER.